United States Patent [19]

Linnecar

[11] 3,839,676

[45] Oct. 1, 1974

[54] H. F. ELECTRICAL SIGNAL RECEPTION WITH TWO WIRE LINE CARRYING POWER, CONTROL, AND INFORMATION SIGNALS

[75] Inventor: Trevor Paul Richard Linnecar, Salfords, nr. Redhill, England

[73] Assignee: U.S. Philips Corporation, New York, N.Y.

[22] Filed: Mar. 23, 1973

[21] Appl. No.: 344,263

[30] Foreign Application Priority Data

May 2, 1972 Great Britain .......................020365

[52] U.S. Cl.................. 325/394, 325/309, 325/453, 325/457, 325/492, 178/DIG. 15, 340/310 R

[51] Int. Cl. ............................................ H04b 1/06

[58] Field of Search ........... 325/308, 309, 435, 437, 325/451, 461, 492, 392, 394, 64, 453, 457; 178/DIG. 11, DIG. 13, DIG. 15; 340/310 R, 310 A, 216, 288; 343/228

[56] References Cited

UNITED STATES PATENTS

| | | | |
|---|---|---|---|
| 3,244,809 | 4/1966 | Fuller et al. | 325/309 |
| 3,423,521 | 1/1969 | Friesen et al. | 325/309 |

*Primary Examiner*—Albert J. Mayer
*Attorney, Agent, or Firm*—Frank R. Trifari; Henry I. Steckler

[57] ABSTRACT

Electrical receiving apparatus in which a signal operating device at a receiving aerial is connected to the remainder of the apparatus by a two-line feeder. The feeder conveys in one direction an electrical signal from the operating device either at carrier frequency or at a frequency displayed therefrom. In the other direction the feeder conveys a power supply voltage for energizing the operating device onto which voltage is superimposed a control voltage for the operating device.

6 Claims, 1 Drawing Figure

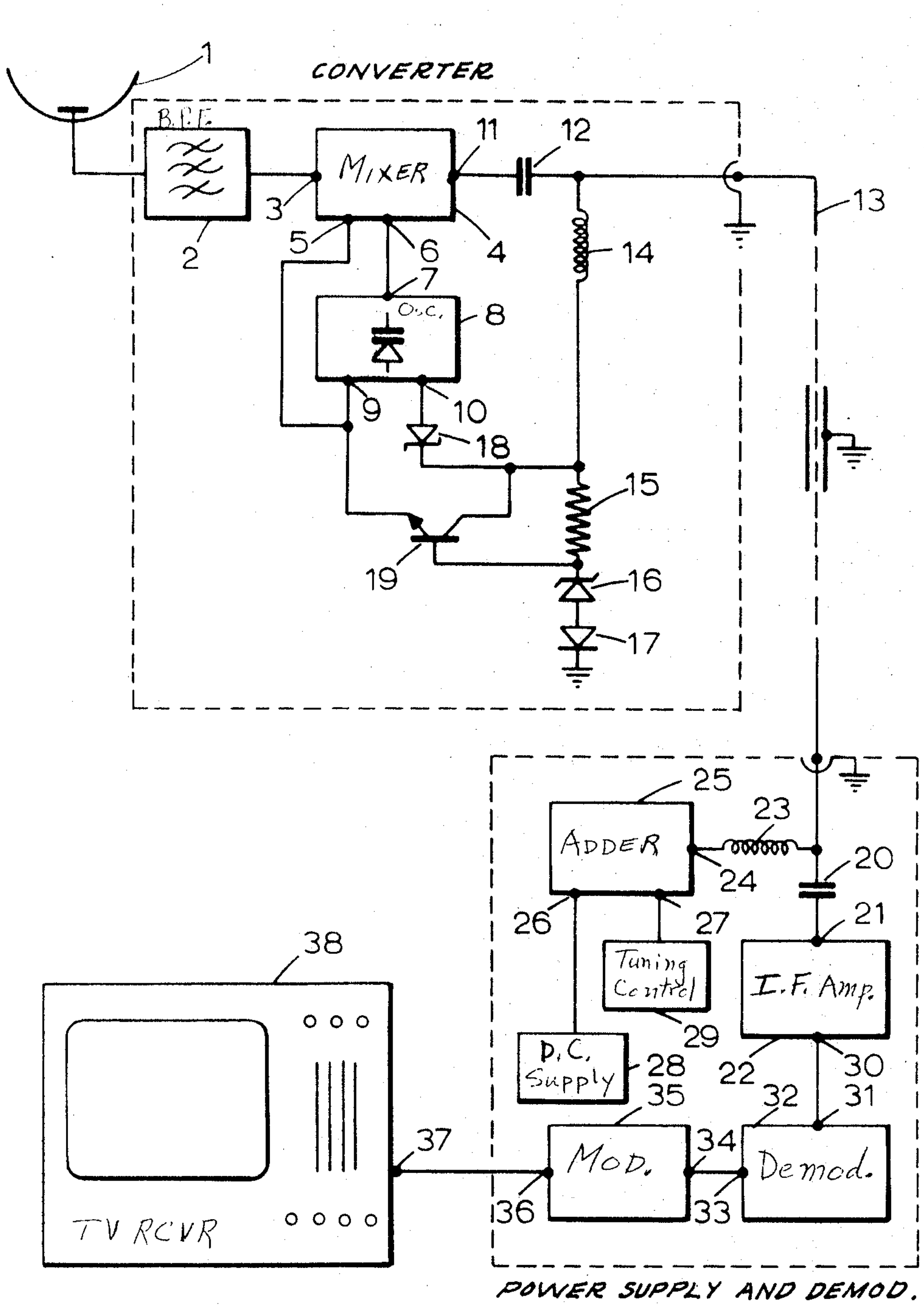
CONVERTER
B.P.F.
MIXER
OSC.
ADDER
Tuning Control
D.C. Supply
I.F. Amp.
Mod.
Demod.
TV RCVR
POWER SUPPLY AND DEMOD.

H. F. ELECTRICAL SIGNAL RECEPTION WITH TWO WIRE LINE CARRYING POWER, CONTROL, AND INFORMATION SIGNALS

This invention relates to apparatus for the reception of high frequency electrical signals. In particular though not exclusively it relates to such apparatus for use with s.h.f. television signals.

With electrical apparatus for receiving signals of very high frequencies and in particular in situations where the signal strength is low, it has been found preferable to provide some amplification of the received signal at the aerial prior to feeding the signal over an aerial feeder cable to a receiver. In this way the signal to noise ratio of the signal is improved over the case where the signal is applied direct from the aerial over a feeder to the receiver without any amplification. Such a situation where the above has been adopted has been in the reception of television signals in areas where the signal strength of the television signal is low. In order to keep the cost as low as possible and reduce the number of cables employed, the two wire aerial feeder which is generally formed as a coaxial cable in addition to conveying the amplified signal from the mast head amplifier to the receiver, additionally conveys the power supply either from the receiver or an associated unit to the mast head amplifier.

The present invention provides apparatus for the reception of high frequency electrical signals, which apparatus comprises means for applying an electrical signal at its carrier frequency from an aerial at which the signal is received to a signal operating device, a two line feeder connecting the signal operating device to an electrical receiver, means for applying the electrical signals from the operating device either at the carrier frequency or at a frequency displaced therefrom over the two line feeder to the electrical receiver, means for producing in the receiver a source of power supply for the signal operating device, means for producing in the receiver a control voltage for the signal operating device, means for superimposing the control voltage onto the voltage of the power supply, means for applying from the receiver to the two line feeder the power supply voltage with the control voltage superimposed thereon, means at the signal operating device for separating the control voltage from the power supply voltage, means for applying the separated power supply to the signal operating device for the energisation of the device and means for applying the separated control voltage to the signal operating device for controlling a function of the signal operating device.

In a modification of the invention where it is desired not to pass the power supply voltage and superimposed control voltage over the two line feeder, then an additional line may be provided to carry these two voltages.

The invention also provides a circuit arrangement for superimposing the control voltage on the power supply voltage and in addition provides a circuit arrangement for separating these voltages.

The above and other features of the invention will be more readily understood by a perusal of the following description with reference to the accompanying drawing the sole FIGURE of which shows apparatus incorporating the invention.

The apparatus to be described is suitable for the reception of television signals from a geostationary satellite, the 1971 World Administrative Radio Conference having authorised the use of bandspace at 12 GHz for this purpose.

Referring to the FIGURE, the reference 1 indicates an aerial for receiving the s.h.f. television signals, the aerial being connected through a bandpass filter 2 to the signal input terminal 3 of a mixer circuit 4. The mixer circuit 4 has two further input terminals 5 and 6, the input terminal 5 receiving the power supply for the mixer whilst the input terminal 6 receives oscillations from the signal output 7 of a local oscillator 8. The local oscillator 8 has two input terminals 9 and 10, terminal 9 receiving the power supply for the local oscillator whilst terminal 10 receives a control voltage for tuning the local oscillator. The output from the mixer is derived from a terminal 11 and applied through a capacitor 12 to one line of a two line feeder 13 the other line being earthed, the feeder being formed in this instance by a coaxial cable. A choke 14 is also connected to the feeder 13, the other end of the choke being connected to the series circuit formed by a resistor 15, a voltage reference diode 16 and a rectifying diode 17, the diodes 16 and 17 being poled in the direction shown whilst the cathode of diode 17 is connected to earth. The junction of choke 14 and resistor 15 is connected through a further voltage reference diode 18 to the input 10 of the local oscillator 8, the junction also being connected to the collector of a transistor 19 whose emitter is connected to the power supply inputs 5 and 9, the base of this transistor being connected to the junction of resistor 15 and voltage reference diode 16.

The live line of the feeder 13 at its end remote from capacitor 12 is connected through a capacitor 20 to the input 21 of an I.F. amplifier 22, the junction of line 13 and capacitor 20 being connected through a choke 23 to the output terminal 24 of an adder circuit 25. The adder circuit 25 has two input terminals 26 and 27, the terminal 26 being connected to a d.c. power supply 28 whilst the terminal 27 is connected to a tuning control unit 29. The output terminal 30 of the I.F. amplifier 22 is connected to the input terminal 31 of a composite unit 32 which performs the functions of demodulation and amplification of the demodulated signal. The output terminal 33 of the unit 32 is connected to the input terminal 34 of a modulator 35 whose output terminal 36 is connected to the aerial input socket 37 of a standard television receiver 38.

The operation of the apparatus is as follows. The aerial 1 receives the 12 GHz television signal which may be frequency modulated, and which is applied through the bandpass filter 2 to the input terminal 3 of the mixer 4. In order to overcome the problem of image rejection this mixer may conveniently be an image rejection mixer of the type described in "The Microwave Journal" September 1961 pp 84 – 87 "Microwave two-phase converters for imageless receivers" by R.B. Wilds. The input terminal 6 of mixer 4 receives the oscillations from the local oscillator 8 so as to produce an I.F. signal at a given frequency which is preferably within the band 40 – 70 MHz. The local oscillator signal will therefore be in the 12 GHz band and may be produced by a bulk effect transit time oscillator such as a coaxial Gunn oscillator which is tuned by a varactor. The I.F. signal appears at the output terminal 11 and is passed through the capacitor to the two line feeder 13, the choke 14 preventing the I.F. signal from taking the other path from capacitor 12, the line 13 conveys the I.F. signal through the capacitor 20 to the input terminal 21 of the I.F. amplifier 22 the amplified signal appearing at the terminal 30 being applied to the input terminal 31 of unit 32. This unit demodulates the frequency modulated I.F. signal and may provide some amplification of the demodulatd signal before it appears at the output terminal 33 from whence it is applied to the input terminal 34 of the modulator 35. The modulator 35 remodulates the demodulated television signal as a normal vestigial sideband television signal at a given carrier frequency within either the U.H.F. band or the V.H.F. band which signal is passed from the output 36 to the aerial input socket 37 of a standard television receiver which processes the signal in the normal manner to produce a television display. If it is not desirable to produce a vestigial sideband signal in the modulator 35 then the modulator could produce a double sideband signal though this would necessitate modification of the television receiver 38.

To the junction of feeder 13 and capacitor 20 is connected the choke 23 which prevents the I.F. signal being passed to the adder circuit 25. The input terminal 26 receives the direct voltage of the power supply 28 which should be stabilised and to which the voltage required for tuning the local oscillator 8 is added in the adder circuit 25, this latter voltage being derived from the tuning control unit 29 and applied to the adder circuit through terminal 27. The output at terminal 24 is therefore the voltage of the power supply onto which is superimposed the tuning control voltage, these voltages being applied through choke 23 over the feeder 13 to the choke 14, capacitors 12 and 20 providing a block to D.C. The combined voltages are applied through choke 14 to the series circuit 15, 16, 17, the reference voltage of the diode 16 being substantially the same as the voltage of the power supply 28, the combination of diodes 16 and 17 assisting in the stability of this voltage with changes in temperature. The base of transistor 19 receives this reference voltage whilst the collector receives the combined voltages and so there is produced at the emitter a supply voltage at the reference voltage. This supply voltage is applied to the terminals 5 and 9 of the mixer 4 and local oscillator 9 respectively to energise these two units. The power handling of the components described must be sufficient for the power requirements of the units and for this reason transistor 19 may be formed by compounding two or more transistors. The combined voltages are also applied to the voltage reference diode 18 which may have the same reference voltage as that of the power supply depending upon the standing voltage required for the oscillator varactor to remove the diode voltage from the combined voltages. The voltage applied to the input terminal 10 of the local oscillator 8 is therefore the tuning control voltage produced by the tuning control unit 29. The d.c. tuning voltage applied to terminal 10 will control the capacitance of the varactor in the local oscillator 8 so that the changes in oscillator frequency required to change the television channel and obtain the given I.F. will be produced by changes in the direct voltage produced by the tuning control unit 29. In addition the tuning control voltage may include a component for carrying out automatic frequency control (a.f.c). This may be obtained by sensing changes in the I.F. to produce a required change in tuning voltage to restore the local oscillator to its correct frequency for the given I.F.

The components 2 to 12 and 14 to 19 are ideally situated adjacent the aerial 1 so that the received s.h.f. signal is not passed over long lossy lines but operated on prior to being passed over the feeder 13. This feeder 13 forms the normal down connection between aerial system and receiver, the components 20 to 36 being located close to the television receiver 38, these components and the television receiver being considered to form the receiver of the invention.

In the arrangement described above the signal operating device is considered to comprise the mixer 4 and local oscillator 8, the control voltage being the tuning control voltage whilst the function it controls is the frequency of the local oscillator. The invention is however not limited to such an arrangement and could be used with apparatus in which the signal operating device is an amplifier for amplifying the s.h.f. signal before being applied at carrier frequency to the feeder. In such a case the function being controlled by the control voltage could be the gain of the amplifier e.g. for automatic gain control. It will be realised that the invention could be used with double superhet and is not limited to its use with television signals.

I claim:

1. Apparatus for the reception of high frequency electrical signals, which apparatus comprises, a signal operating device, means for applying an electrical signal to said signal operating device, an electrical receiver, a two line feeder connecting the signal operating device to said electrical receiver, means for applying the electrical signals from the operating device over the two line feeder to the electrical receiver, means for producing in the receiver a source of direct current power supply for the signal operating device, means for producing in the receiver a direct current control voltage for the signal operating device, means for superimposing the control voltage onto the voltage of the power supply, means for applying from the receiver to the two line feeder the power supply voltage with the control voltage superimposed thereon, means at the signal operating device for separating the control voltage from the power supply voltage, means for applying the separated power supply to the signal operating device for the energisation of the device, and means for applying the separated control voltage to the signal operating device for controlling a function of the signal operating device.

2. Apparatus as claimed in claim 1, in which said signal operating device comprises a mixer and oscillator means for providing an intermediate frequency signal, the function controlled by the separated control voltage being the frequency of the oscillator.

3. Apparatus as claimed in claim 1, in which the superimposing means comprises an adder circuit, a choke means for coupling the output of said adder to said two line feeder, and a capacitor means for coupling one line of said feeder to the circuitry of said electrical receiver.

4. Apparatus for the reception of high frequency electrical signals, which apparatus comprises, a signal operating device, means for applying one electrical signal to said signal operating device, an electrical receiver, a two line feeder connecting the signal operating device to said electrical receiver, means for applying the electrical signals from the operating device over the two line feeder to the electrical receiver, means for producing in the receiver a source of direct current power supply for the signal operating device, means for producing in the receiver a direct current control voltage for the signal operating device, means for superimposing the control voltage onto the voltage of the power supply, means for applying from the receiver to the two line feeder the power voltage with the control voltage superimposed thereon, means at the signal operating device for separating the control voltage from the power supply voltage comprising an emitter follower circuit having collector, base, and emitter electrodes, means for applying the separated power supply to the signal operating device for the energisation of the device, means for applying the separated control voltage to the signal operating device for controlling a function of the signal operating device, means for applying the power supply and superimposed control voltage to said collector, means for applying a voltage substantially at the power supply voltage to said base, and means for deriving from the emitter of said circuit the separated power supply.

5. Apparatus as claimed in claim 4 further comprising a voltage reference device means for receiving said power supply and superimposed control voltage and for supplying the required control voltage for said signal operating device, the voltage of said voltage reference device being that of said power supply.

6. Apparatus as claimed in claim 4, in which said power supply and superimposed control voltage is applied to a voltage reference device from which the required control voltage for said signal operating device is obtained, the voltage of said voltage reference device being that of said power supply.

* * * * *

PO-1050
(5/69)

UNITED STATES PATENT OFFICE
CERTIFICATE OF CORRECTION

Patent No. 3,839,676 Dated October 1, 1974

Inventor(s) TREVOR PAUL RICHARD LINNECAR

It is certified that error appears in the above-identified patent and that said Letters Patent are hereby corrected as shown below:

IN THE TITLE PAGE below "Foreign Application Priority Data" cancel "020365"

and insert -- 20365/72 --;

Signed and sealed this 3rd day of December 1974.

(SEAL)
Attest:

McCOY M. GIBSON JR.
Attesting Officer

C. MARSHALL DANN
Commissioner of Patents